United States Patent [19]
Deters

[11] 3,865,512
[45] Feb. 11, 1975

[54] CONTROL APPARATUS FOR A WATER SUPPLY SYSTEM

[75] Inventor: Elmer M. Deters, Muscatine, Iowa
[73] Assignee: Weil-McLain Co., Inc., Dallas, Tex.
[22] Filed: Nov. 19, 1973
[21] Appl. No.: 416,957

[52] U.S. Cl. .................................. 417/26, 417/44
[51] Int. Cl. ............................................ F04b 49/00
[58] Field of Search ............ 417/44, 26; 137/614.21

[56] References Cited
UNITED STATES PATENTS
2,761,389  9/1956  Turner .......................... 137/614.21
3,283,094  11/1966  Lung ..................................... 417/44

Primary Examiner—William L. Freeh
Attorney, Agent, or Firm—Morsbach & Pillote

[57] ABSTRACT

A control apparatus for a water supply system having a motor operated pump for pumping water through a delivery line to one or more valved outlets. The control apparatus includes a pressure switch responsive to the pressure in the delivery line and operable at preselected upper and lower pressure limits to respectively stop and start the pump motor, and a control valve for controlling flow from the pump to the delivery line operable during normal flow from the delivery line to maintain the delivery line pressure in a regulated pressure range below the upper switch operating pressure and operable when flow from the delivery line is terminated to cause the pressure in the delivery line to rapidly build up to the upper switch operating pressure. The control valve also has provision for shutting off flow to the delivery line when the pressure rises above the upper switch operating pressure, to prevent further increase in pressure in the delivery line.

5 Claims, 10 Drawing Figures

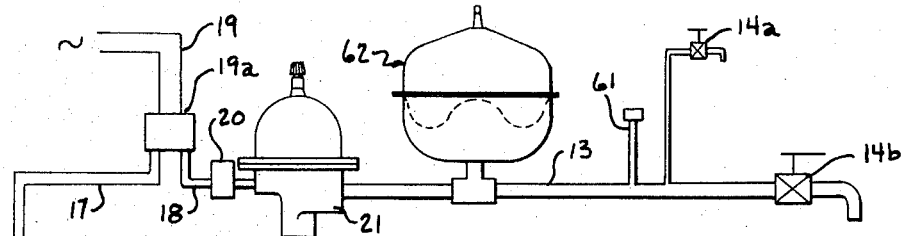
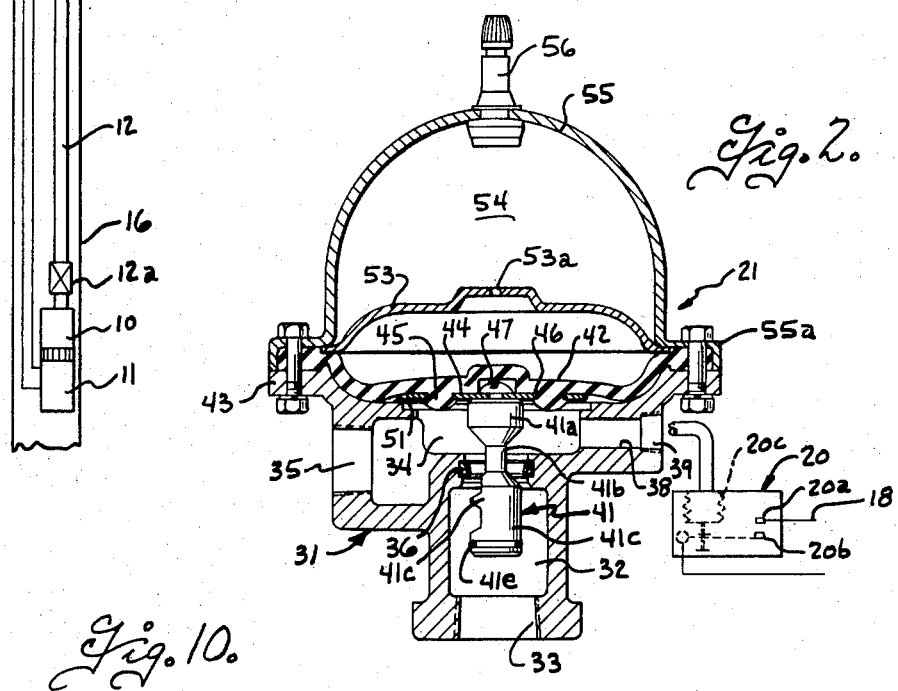
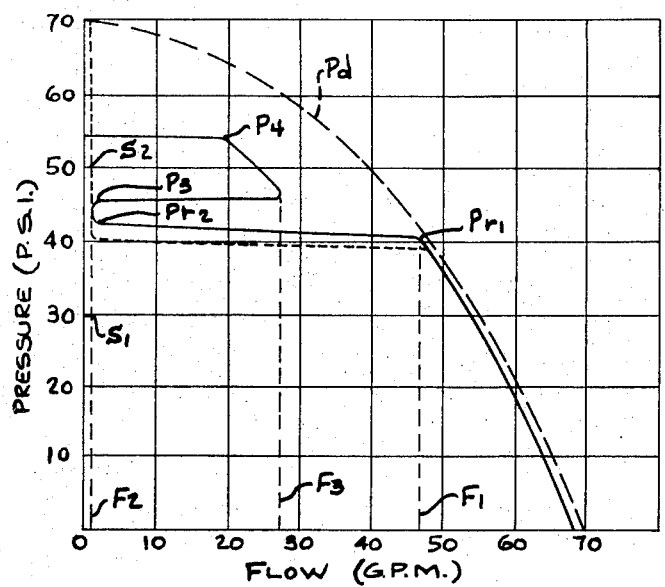
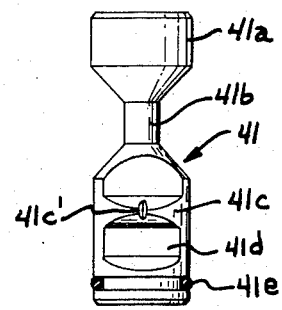

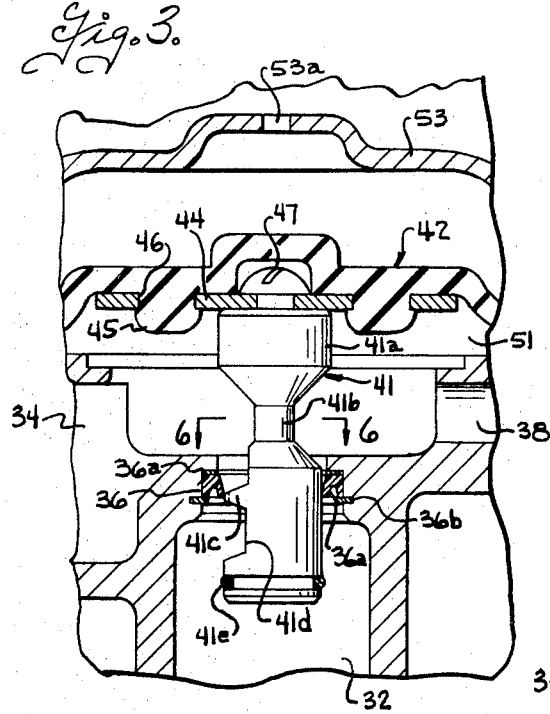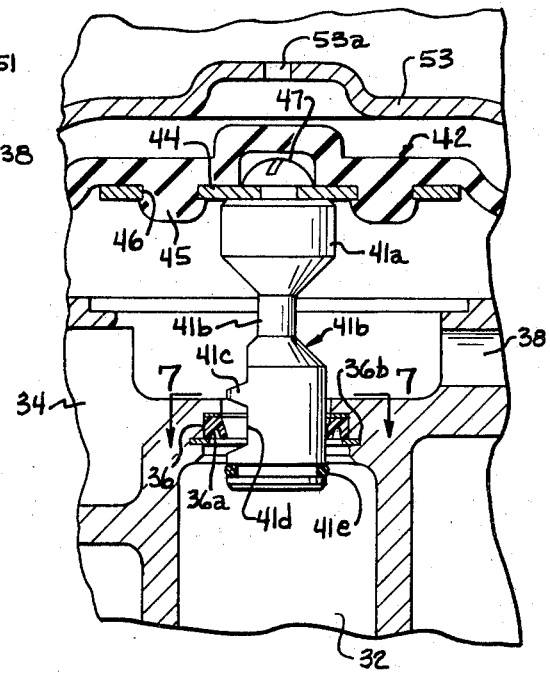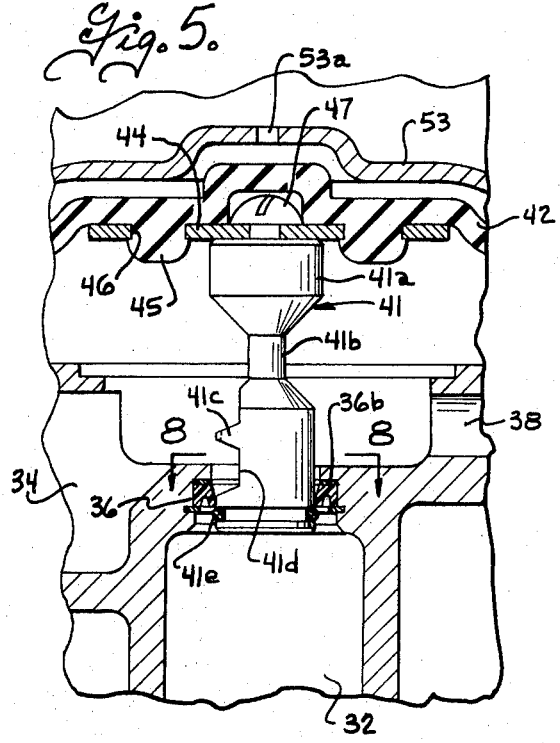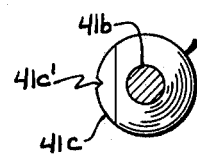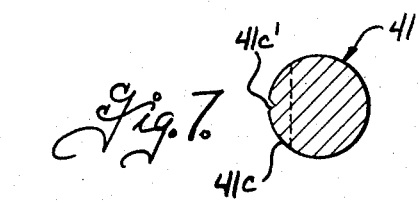

CONTROL APPARATUS FOR A WATER SUPPLY SYSTEM

BACKGROUND OF THE INVENTION

The present invention relates to a control apparatus for a water supply system having a motor operated pump for pumping water through a delivery line to one or more valved outlets. Such water system control apparatus in general include a pressure switch responsive to the pressure in the delivery line and operable at preselected upper and lower pressure limits to respectively stop and start the pump, and a valve for controlling flow from the pump to the delivery line operable during normal flow from the line to maintain the pressure in the line in a regulated pressure range below the upper switch operating pressure, and operable when flow from the line is terminated from the pump into the delivery line, to cause the pressure in the line to build up to the upper switch operating pressure and stop the pump. In such control apparatus, the pump will cycle on and off if the flow from the delivery line is less than the bypass rate and it is accordingly desirable to make the bypass rate very small to minimize the flow rate below which cycling can occur. However, under some conditions, such as due to an improperly closed outlet valve or other leakage from the delivery line, very low flows can occur from the line and, in order to prevent rapid cycling of the pump motor with consequent danger of motor failure at such low flow rates, it is also desirable to provide an expansion chamber in the delivery line to maintain the pressure in the delivery line above the lower switch operating pressure for a time interval after stopping the pump.

One such water system control apparatus is disclosed in the U.S. Pat. to O. F. Johnsen No. 3,100,505. In the control apparatus disclosed in that patent, the diaphragm is arranged to move away from the valve member when the valve member closes and the pressure in the line increases above the regulated pressure to provide a small expansion chamber. An objection to that water system control apparatus was that the restricted flow of fluid through the bypass caused a slow buildup of pressure in the delivery line so that there was a substantial time lapse between the stopping of the discharge from the delivery line and the stopping of the pump. This is particularly serious at very low flow rates from the delivery line at which the control apparatus causes the motor pump to cycle on and off. This objection was recognized by that patentee and in his later U.S. Pat. No. 3,106,894, there is disclosed a modified water system control apparatus utilizing a primary valve formed by a stationary seat and a movable valve member operated under the control of a pressure responsive operator to regulate the pressure in the delivery line during normal flow therefrom, and a secondary valve formed between the upper end of the stem of the primary valve member and the diaphragm, which secondary valve is arranged to open after the primary valve is closed, to effect rapid filling of the expansion chamber. While the construction shown in this last-mentioned patent decreases the time lapse between the termination of flow and the stopping of the pump, it does increase the complexity of the valve apparatus and cost of making the same. Moreover, since the diaphragm is not attached to the stem of the primary valve, the diaphragm does not operate to positively move the primary valve to its closed position so that the valve apparatus is sensitive to foreign material and can stick in an open position if dirt becomes lodged in any of the relatively moving parts.

In my copending application Ser. No. 300,211, filed Oct. 24, 1972, now U.S. Pat. No. 3,782,858, there is disclosed a water system control apparatus in which the diaphragm that operates the valve to maintain a generally uniform regulated pressure in the delivery line during normal flow from the delivery line, is also arranged to function as a small expansion chamber to limit the frequency at which the control apparatus cycled the pump motor, when water was drawn from the delivery line at a rate below the bypass rate. In order to minimize the delay between termination of draw and shut off of the pump motor, provision was made for limiting expansion of the diaphragm when the valve member moved to its closed position.

While my prior control apparatus for a water supply system operated satisfactorily in many installations, some problems were encountered in installations where there was an additional expansion area in the delivery line, such as an air chamber to prevent water hammer, or an additional pneumatic storage tank. In such installations, the pump on-time after termination of draw sometimes became excessively long. Problems were also encountered in installations where nonrigid piping was used between the pump and the flow control apparatus. In such installations, the pressure at the delivery line side of the control apparatus would build up substantially above the upper switch operating pressure when the pump was shut off. This was found to be due to the expansion of the nonrigid pipe at the inlet side of the valve when the pump was operating, and the transfer of this volume of high pressure water through the valve, after the pump was shut off.

SUMMARY OF THE INVENTION

The present invention relates to improvements in water control apparatus of the type described. The control apparatus includes a pressure switch responsive to the pressure in the delivery line and operable at preselected upper and lower pressure limits to respectively stop and start the pump motor, and a valve that controls flow from the pump to the delivery line. In accordance with the present invention, the control valve has an annular inwardly facing valve seat intermediate the inlet chamber and outlet chamber, a pressure responsive operator that is responsive to the pressure in the outlet chamber and a valve member which is movable by the pressure responsive operator to a different axial position relative to the seat. The valve member includes a flow regulating valve element which is movable from an open position at one side of the seat to a flow throttling position spanning the seat to progressively throttle flow through the valve seat as flow from the delivery line is decreased to thereby maintain the pressure in the delivery line in a regulated pressure range below the upper switch operating pressure, and the flow regulating valve element is movable by the pressure responsive operator to a second open position at the other side of the seat, when flow from the delivery line is terminated, to provide increased flow to the delivery line for pressurizing the delivery line and any expansion chambers in the line to the upper switch operating pressure and thereby stop the pump. The valve member is also movable with the pressure responsive operator to still another axial position to shut off flow from the inlet to the delivery line when the pressure at the delivery line rises above the upper switch operating pressure, to thereby prevent a further increase in pressure in the delivery line.

These, together with other features and advantages of this invention will be more readily understood by reference to the following detailed description, when taken in connection with the accompanying drawings wherein:

FIG. 1 is a diagrammatic view of a water system installation embodying the control apparatus of the present invention;

FIG. 2 is a sectional view through the valve apparatus illustrating the valve member in a pressure regulating position at maximum flow from the delivery line;

FIG. 3 is a fragmentary sectional view through the valve apparatus of FIG. 2 illustrating the parts on a larger scale and with the valve member in its flow restricting position when flow from the delivery line is reduced to less than the bypass rate;

FIG. 4 is a fragmentary sectional view through the valve member of FIG. 2 on a larger scale and illustrating the valve member in its position at upper switch operating pressure;

FIG. 5 is a fragmentary sectional view through the valve member of FIG. 2 on a larger scale and illustrating the valve member in its shut-off position;

FIG. 6 is a transverse sectional view through the valve member taken on the plane 6—6 of FIG. 3;

FIG. 7 is a transverse sectional view through the valve member taken on the plane 7—7 of FIG. 4;

FIG. 8 is a transverse sectional view through the valve member taken on the plane 8—8 of FIG. 5;

FIG. 9 is a side elevational view of the valve member taken on the plane at right angles to the view of FIG. 3; and FIG. 10 is a graph illustrating the change in pump pressure and delivery line pressure with flow through the delivery line.

Referring now more specifically to FIG. 1 there is diagrammatically illustrated a water supply system having a pump 10 which is driven by an electric motor 11 to deliver water through a pump discharge conduit 12 to a delivery line 13 leading to one or more valved outlets indicated at 14a and 14b. The pump 10 is preferably of the non-positive displacement type, to avoid overloading the pump motor when the flow from the pump is throttled and may, for example, be a centrifugal-type pump or a jet-type pump. As diagrammatically illustrated in FIG. 1, the pump 10 is disposed in a well 16 to pump water from the well through the discharge conduit to the delivery line, it being understood that the pump could be arranged to receive water from a different water supply such as a tank or even another pumping system, to boost the water pressure from the pressure at the water supply to a preselected substantially constant pressure in the delivery line. A check valve 12a is provided in the pump discharge conduit to maintain the pressure in the delivery line, when the pump is stopped.

The water system control apparatus in general includes a pressure switch 20 for controlling starting and stopping of the pump motor at preselected lower and upper pressures in the delivery line, and a pressure responsive flow control valve 21 for controlling flow from the pump discharge conduit 12 to the delivery line 13 and to the pressure switch 20. The pressure switch 20 is of the type commonly used in water supply systems and, as diagrammatically illustrated in FIG. 2, includes a pressure responsive actuator 20c which is operative at a preselected lower pressure, for example 30 p.s.i., to close the motor control contacts 20a and 20b and thereby start the pump motor, and which pressure switch maintains the contacts closed to energize the pump motor until the pressure rises to a preselected upper pressure limit, for example 50 p.s.i., at which time the pressure switch opens the motor control contacts 20a, 20b and stops the pump motor. The contacts 20a, 20b then remain open until the pressure again drops below the lower switch operating pressure. Such pressure switches which operate to start and stop the pump drive motor at selected upper and lower pressure limits are well known and further detailed illustration and description is deemed unnecessary. As diagrammatically shown in FIG. 1, the pump motor 11 and the pressure switch 20 are respectively connected through conductors 17 and 18 to a source of electrical power indicated by the lines 19 at a junction box 19a, it being understood that the pressure operated motor control switch 20 is connected either directly or through relays to the pump motor so as to start and stop the pump motor at the lower and upper pressure limits respectively.

The valve apparatus 21 is best shown in FIGS. 2–5 and includes a valve body 31 having an inlet chamber 32 adapted for connection as by a threaded inlet passage 33 to the pump discharge conduit 12; an outlet chamber 34 adapted for connection as by a threaded outlet passage 35 to the delivery line 13, and a valve seat 36 intermediate the inlet and outlet chambers. The pressure switch 20 is connected for operation in response to the pressure in the delivery line 13 and, conveniently, the valve body is provided with a passage 38 that communicates with the outlet chamber 34 and hence with the delivery line, and which is adapted for connection as by a threaded fitting 39 to the pressure switch operator 20c.

The control valve 21 also includes a valve member 41 which is movable to different axial positions relative to the seat 36 to control flow therethrough, and a pressure responsive operator 42 which is attached to the valve member 41 and which is responsive to the pressure in the outlet chamber for moving the valve member to different axial positions. In the embodiment illustrated, the pressure responsive operator is in the form of a flexible diaphragm which is peripherally attached to a mounting flange 43 on the valve body and which has a central portion movable in a direction axially of the seat 36 between a lower position as shown in FIG. 2 and a raised position as shown in FIG. 5. The valve member 41 is attached to the central portion of the diaphragm for movement therewith and, as shown, a diaphragm reinforcing plate 44 is attached to the underside of the diaphragm by integral headed protuberances 45 on the diaphragm that extend through openings 46 in the diaphragm reinforcing plate. The valve member 41 has a head 41a at one end which is attached to the reinforcing plate as by a fastener 47. The valve body is formed with a diaphragm bowl 51 at the underside of the diaphragm arranged to engage and support the diaphragm in its lower position and, preferably, a diaphragm stop plate 53 overlies the upper side of the diaphragm to engage and support the diaphragm in its raised position.

The diaphragm bowl 51 is in open communication with the outlet chamber 34 so that the pressure in the outlet chamber is applied to the underside of the diaphragm. A means is provided for yieldably biasing the valve toward its lower position, against the force exerted on the diaphragm by the pressure at the outlet chamber and, in the preferred embodiment illustrated, the valve biasing means is of the pneumatic type and includes a pressure bell 55 having a flange 55a attached to the valve body in sealed relation to the diaphragm. The pressure bell is pneumatically charged as through a valve 56 to a pressure intermediate the upper and lower switch operating pressures. For example, if the upper and lower switch operating pressures are 50 p.s.i. and 30 p.s.i. respectively, then the pressure bell is precharged to a pressure such as 40 p.s.i. when the diaphragm is in its lower position, so that the diaphragm and valve member begin to move upwardly only when the pressure in the outlet chamber rises above the precharged pressure of 40 p.s.i. The diaphragm backup plate 53 has one or more openings 53a to allow free communication between the pressure bell and the upper side of the diaphragm, and the pressure bell preferably has a volume which is at least several times larger than the volume displaced by the diaphragm in moving from its lower to its upper position to minimize the change in pneumatic pressure in the bell during movement of the diaphragm between its lower and its raised positions.

The valve member 41 has a stem 41b that extends through the valve seat 36, which stem has a cross-sectional area that is small as compared to the cross-sectional area of the valve seat so as to allow relatively unrestricted flow of water from the inlet chamber 32 to the outlet chamber 33, when the valve member is in its lowered position as shown in FIG. 2. The valve member also has a flow regulating valve element or portion 41c that is spaced below the valve seat 36, when the valve member is in its lower position shown in FIG. 2, and which flow regulating valve element is movable upwardly toward the seat to throttle flow through the seat and maintain the pressure in the delivery line at a relatively constant value below the upper switch operating pressure. For example, when the pressure bell is charged to the aforementioned 40 p.s.i. with the diaphragm in its lower position, the diaphragm and valve member will move upwardly when the pressure in the outlet chamber rises above the aforementioned 40 p.s.i. and, when the pressure in the outlet chamber increases several p.s.i. above 40 p.s.i., for example to 44 p.s.i., the valve member will be raised to an intermediate position with the flow regulating element or portion 41c extending across the valve seat 36. The flow regulating portion 41c is dimensioned to span the valve seat when the valve member is in its intermediate position and restrict flow through the valve seat to a relatively low bypass rate. While the flow regulating element or portion 41c of the valve member can be in the form of a flat disk dimensioned to span the seat, it is preferably shapted as shown in the drawings to have a cross-sectional area that gradually increases from the cross-sectional area of the stem to the full seat spanning cross-section of the valve element 41c to gradually throttle flow through the seat over a longer portion of the stroke of the valve member.

The bypass rate determines the minimum draw rate from the delivery line at which the valve will maintain a generally uniform regulated pressure in the delivery line and, it is desirable to make the bypass rate very low, for example, of the order of one-tenth gallon per minute. For reasons whcih will become apparent hereinafter, the bypass is provided in the valve member 41 and is in the form of a small notch 41c' (FIG. 9) in the periphery of the flow regulating valve element 41c, which notch allows the aforedescribed bypass flow through the seat, when the flow regulating valve element is in its intermediate position spanning the seat. In order to maintain a seal around the flow regulating valve element, except at the notch 41c', the seat 36 is preferably formed of a resilient material that is radially expansible and contractible to engage the flow regulating valve element 41c. As best shown in FIGS. 3–5, the seat 36 is in the form of an annular ring of resilient material for example a polytetrafluroethylene polymer, which is preferably grooved as indicated at 36a at its underside to provide a lip-type seal. The annular seat is retained in position by a split ring collar 36b and a resilient gasket of rubber or the like indicated at 36c, is preferably interposed between the annular ring seat and the valve body to form a fluid tight seal therebetween.

The upper limit of the regulated pressure range is substantially below the upper switch operating pressure and the bypass passage 41c' in the flow regulating valve element 41c allows a restricted flow of fluid to flow from the inlet chamber to the outlet chamber to cause the pressure in the outlet chamber and delivery line to increase. The diaphragm 42, as it moves from its lower position shown in FIG. 2 to the upper switch operating position shown in FIG. 4, does function as a small expansion chamber in the delivery line. However, it is also sometimes desirable to provide air chambers such as 61 in the delivery line to prevent water hammer, and it is also sometimes desirable to provide an additional pneumatic water accumulator tank, such as indicated at 62 in the delivery line, to reduce the frequency at which the control apparatus will cycle the pump motor on and off when water is drawn or leaks from the delivery line at rates below the bypass rate. When the total expansion volume in the delivery line system including the expansion volume of the diaphragm 42 as it moves from its lower to its raised position, and the expansion volume of any air chambers such as 61 used to prevent water hammer or any additional pneumatic storage tank such as are large, the pump run time, after water flow from the delivery line is stopped, can become excessively long. In order to reduce the time required to pressurize the system, after termination of draw, the flow regulating valve element 41c is dimensioned to pass axially through the valve seat to a second open position at the outlet chamber side of the valve seat, and the valve member 41 is provided with a flow limiting portion 41d spaced below the valve element 41c. The flow limiting portion 41d of the valve member, has a cross-sectional area that is smaller than the maximum cross-sectional area of the flow regulating valve element 41c, but larger than the cross-sectional area of the stem portion 41b so as to limit flow from the inlet chamber to the outlet chamber to a rate above the bypass rate and below full pump delivery rate, to effect a rapid filling and pressurizing of the outlet chamber and delivery line to the upper switch operating pressure.

When the pressure in the outlet chamber reaches the upper switch operating pressure, the pump is stopped and the check valve 12a in the pump discharge line will close to maintain pressure in the system. If the pump discharge line is of the nonrigid type, for example where a long length of plastic pipe is used between the pump and the flow control valve 21, the pump discharge pressure acting on the plastic pipe will cause the pipe to expand somewhat when the pump is operating. When the pump is stopped and the check valve 12a closed, the plastic pipe will contract and force a volume of high pressure water through the valve into the delivery line. This can cause a further increase in pressure in the delivery line. In order to prevent excessive buildup of pressure in the delivery line above the upper switch operating pressure, the valve member 41 is provided with a flow shutoff portion 41e which is spaced axially below the flow limiting portion 41d and which is arranged to span the seat and shut off flow when the valve member is moved to its fully raised position as shown in FIG. 5. As shown, the flow shutoff portion 41e is dimensioned to span the valve seat 36 and has a resilient seal face in the form of an O-ring for engaging the seat 36 to seal the interface therebetween.

From the foregoing it is thought that the construction and operation of the water system control apparatus will be readily understood. For the purpose of describing the operation, it is assumed that the pressure switch 20 is arranged to start the pump at a preselected lower switch operating pressure such as 30 p.s.i. indicated at $S_1$ in FIG. 10 and to stop the pump at a preselected upper switch operating pressure such as 50 p.s.i. indicated at $S_2$ in FIG. 10. The pressure bell 55 is precharged to a pneumatic pressure such as 40 p.s.i. when the diaphragm is in its lowered position shown in FIG. 2, which pressure is intermediate the upper and lower switch operating pressures. When one of the outlet valves 14a, 14b in the delivery line is opened, the pressure in the delivery line will drop below the lower switch operating pressure $S_1$ and start the pump. The pump, when started, will rapidly build up the pressure in the delivery line to 40 p.s.i. and at that time the diaphragm begins to move upwardly and move the flow regulating valve element 41c toward the seat to throttle the flow from the inlet chamber to the outlet chamber and maintain the pressure in the outlet chamber and delivery line at a value below the upper switch operating pressure. The flow regulating valve element 41c operates to regulate flow through the seat 36 in a relatively small portion of the overall stroke of the valve member as it moves from its lowered position shown in FIG. 2 to its intermediate seat spanning position shown in FIG. 3 and in response to a relatively small change in pressure in the outlet chamber at the underside of the diaphragm. For example, the diaphragm will move from its lowered position shown in FIG. 2 with the valve member in its fully opened position at a pressure such as 40 p.s.i. indicated at $Pr_1$ in the graph of FIG. 10, and the diaphragm will move upwardly to an intermediate position in which the flow regulating valve element spans the seat as shown in FIG. 3 at a pressure which is only a few pounds higher than the pressure $Pr_1$, for example a pressure of 44 p.s.i. and indicated at $Pr_2$ in FIG. 10. Thus, when the pump is operating, the pump discharge pressure in the pump discharge line 12 will vary as indicated by the pressure-flow curve Pd in FIG. 10. However, when the flow from the delivery line is above the bypass rate, the diaphragm 42 will operate the valve member to throttle flow from the pump discharge line 12 to the delivery line 13 and maintain the delivery line pressure substantially constant in a range between $Pr_1$, when flow from the delivery line equals full pump flow at that pressure, indicated at $F_1$ in FIG. 10 to a slightly higher pressure $Pr_2$ when the flow from the delivery line is throttled to a flow indicated at $F_2$ in FIG. 10 that is just above the bypass rate.

When the flow from the line is throttled below the bypass rate $F_2$ or is shut off, the bypass 41c' passes a restricted flow of water, for example at a rate of about one-tenth gallon per minute into the outlet chamber. When the pressure in the outlet chamber rises slightly above $Pr_2$, for example to a pressure indicated at $P_3$ in FIG. 10 which is 1 or 2 pounds above the pressure $Pr_2$, the flow regulating valve element will move through the valve seat to a second open position at the other side of the valve seat and the flow limiting portion 41d will move into position at the valve seat. The rate of flow through the valve seat is therefore increased to an intermediate flow rate indicated at $F_3$ in FIG. 10 that is substantially above the bypass rate and below full pump discharge rate to allow rapid filling and pressurizing of the delivery line and any expansion chambers in the delivery line. The pressure in the delivery line will therefore rapidly build up to the upper switch operating pressure $S_2$ such as 50 p.s.i. to stop the pump. If the pump discharge line 12 is of the nonrigid type such as plastic pipe, the discharge line 12 will contract when the pump is shut off and force water through the valve 21. This will increase the pressure in the delivery line 13 above the upper switch operating pressure and when the pressure in the delivery line increases a small amount above the upper switch operating pressure to a pressure such as 55 p.s.i. and indicated at $P_4$ in FIG. 10, the diaphragm will move upwardly to a position as shown in FIG. 5 in which the shutoff portion 41e of the valve member spans the seat to terminate flow to the delivery line and prevent further buildup of pressure in the delivery line.

The embodiment of the invention in which an exclusive property or privilege is claimed are defined as follows:

1. A control apparatus for a water system of the type having a motor operated pump for pumping water through a delivery line to one or more valved outlets, said control apparatus being adapted to control starting and stopping of the pump motor and to maintain the pressure on the water supplied to the delivery line in a narrow regulated pressure range as the flow from the delivery line varies over a wide flow range between a low bypass rate and full pump delivery rate at said regulated pressure range, said control apparatus comprising,
    a. a valve body having an annular inwardly facing valve seat, an inlet chamber at one side of the seat adapted for connection to a pump and an outlet chamber at the other side of the seat adapted for connection to a delivery line of a water system,
    b. pressure operated motor control switch means responsive to the pressure at said outlet chamber for engergizing the pump motor when the pressure at the outlet chamber reaches a preset lower switch operating pressure below said regulated pressure range and for deenergizing the pump motor when the pressure at the outlet chamber reaches a preset upper switch operating pressure above said regulated pressure range, c. a diaphragm peripherally attached to said valve body at said outlet chamber side of the seat and having one side exposed to the fluid pressure at said outlet chamber, a valve member attached to said diaphragm at the outlet chamber side of the seat and extending through said seat into the inlet chamber, valve biasing means yieldably urging said diaphragm toward said seat and against the force of the fluid pressure acting on said one side of the diaphragm to move the valve member to a first axial position when the pressure in the outlet chamber is below said regulated pressure range, said diaphragm being operative in response to the pressure in said outlet chamber to move said valve member from said first axial position to a second axial position when the pressure in the outlet chamber increases to the upper limit of said regulated pressure range and to move said valve member to a third axial position when the pressure in the outlet chamber increases to a value above said regulated pressure range and below said upper switch operating pressure.

d. said valve member having a reduced diameter stem portion and an enlarged flow regulating portion and a flow limiting portion at different axial locations therealong such that the stem portion is located at the seat in said first axial position of the valve member, said flow regulating portion is located at the seat in said second axial position of the valve member, and said flow limiting portion is located at the seat in said third axial position of the valve member, said stem portion having a cross-sectional area that is small as compared to the seat to allow relatively unrestricted flow therethrough; said flow regulating portion having a cross-sectional area to substantially span the seat and restrict flow therethrough to said low bypass rate, and said flow limiting portion having a cross-sectional area intermediate that of the stem portion and the flow regulating portion to increase flow through the seat above said low bypass rate when the pressure in the outlet chamber rises above said regulated pressure range and more rapidly build up pressure at the outlet chamber side of the valve seat to said upper switch operating pressure.

2. A control apparatus for a water system according to claim 1 wherein said diaphragm is operative to move said valve member to a fourth axial position when the pressure at the outlet chamber rises to a value above said upper switch operating pressure, said valve member having a flow shutoff portion thereon dimensioned to fully span the seat and shut off flow therethrough in the fourth axial position of the valve member to limit further increase in pressure in the outlet chamber.

3. A control apparatus for a water system of the type having a motor operated pump for pumping water through a delivery line to one or more valued outlets, said control apparatus being adapted to control starting and stopping of the pump motor and to maintain the pressure on the water supplied to the delivery line in a narrow regulated pressure range as the flow from the delivery line varies over a wide flow range between a low bypass rate and full pump delivery rate at said regulated pressure range, said control apparatus comprising, a. a valve body having an annular inwardly facing valve seat, an inlet chamber at one side of the seat adapted for connection to a pump and an outlet chamber at the other side of the seat adapted for connection to a delivery line of a water system, b. pressure operated motor control switch means responsive to the pressure at said outlet chamber for energizing the pump motor when the pressure at the outlet chamber reaches a preset lower switch operating pressure below said regulated pressure range and for deenergizing the pump motor when the pressure at the outlet chamber reaches a preset upper switch operating pressure above said regulated pressure range, c. a diaphragm peripherally attached to said valve body at said outlet chamber side of the seat and having one side exposed to the fluid pressure at said outlet chamber, a valve member attached to said diaphragm at the outlet chamber side of the seat and extending through said seat into the inlet chamber, valve biasing means yieldably urging said diaphragm toward said seat and against the force of the fluid pressure acting on said one side of the diaphragm to move the valve member to a first axial position when the pressure in the outlet chamber is below said regulated pressure range, said diaphragm being operative in response to the pressure in said outlet chamber to move said valve member from said first axial position to a second axial position when the pressure in the outlet chamber increases to the upper limit of said regulated pressure range; to move said valve member to a third axial position when the pressure in the outlet chamber increases to a value above said regulated pressure range and below said upper switch operating pressure; and to move said valve member to a fourth axial position when the pressure at the outlet chamber rises to a value above said upper switch operating pressure, d. said valve member having a reduced diameter stem portion and an enlarged flow regulating portion and a flow limiting portion and a flow shutoff portion at different axial locations therealong such that the stem portion is located at the seat in said first axial position of the valve member, said flow regulating portion is located at the seat in said second axial position of the valve member, said flow limiting portion is located at the seat in said third axial position of the valve member, and said flow shutoff portion is located at the seat in said fourth axial position of the valve member, said stem portion having a cross-sectional area that is small as compared to the seat to allow relatively unrestricted flow therethrough; said flow regulating portion having a cross-sectional area to substantially span the seat and restrict flow therethrough to said low bypass rate, and said flow limiting portion having a cross-sectional area smaller than that of the flow regulating portion to increase flow through the seat above said low bypass rate when the pressure in the outlet chamber rises above said regulating pressure range, and said flow shutoff portion being dimensioned to fully span the seat in said fourth axial position to shut off flow therethrough and limit further increase in pressure in the outlet chamber.

4. In a water supply system including a delivery line having one or more valved outlets and a motor operated pump connected to the delivery line and operable to pump water therethrough, a control apparatus adapted to control starting and stopping of the pump motor and to maintain the pressure on the water supplied to the delivery line in a narrow regulated pressure range as the flow from the delivery line varies over a wide flow range between a low bypass rate and full pump delivery rate at said regulated pressure range, said control apparatus comprising,
 a. a valve body having an annular inwardly facing valve seat, an inlet chamber at one side of the seat connected to the pump and an outlet chamber at the other side of the seat connected to the delivery line,
 b. pressure operated motor control switch means responsive to the pressure in said delivery line for energizing the pump motor when the pressure in the delivery line reaches a preset lower switch operating pressure below said regulated pressure range and for deenergizing the pump motor when the pressure at the outlet chamber reaches a preset upper switch operating pressure above said regulated pressure range,
 c. a diaphragm peripherally attached to said valve body at said outlet chamber side of the seat and having one side exposed to the fluid pressure in said delivery line, a valve member attached to said diaphragm at the outlet chamber side of the seat and extending through said seat into the inlet chamber, valve biasing means yieldably urging said diaphragm toward said seat and against the force of the fluid pressure acting on said one side of the diaphragm to move the valve member to a first axial position when the pressure in the delivery line is below said regulated pressure range, said diaphragm being operative in response to the pressure in said delivery line to move said valve member from said first axial position to a second axial position when the pressure in the delivery line increases to the upper limit of said regulated pressure range and to move said valve member to a third axial position when the pressure in the delivery line increases to a valve above said regulated pressure range and below said upper switch operating pressure,
 d. said valve member having a reduced diameter stem portion and an enlarged flow regulating portion and a flow limiting portion at different axial locations therealong such that the stem portion is located at the seat in said first axial position of the valve member, said flow regulating portion is located at the seat in said second axial position of the valve member, and said flow limiting portion is located at the seat in said third axial position of the valve member, said stem portion having a cross-sectional area that is small as compared to the seat to allow relatively unrestrited flow therethrough; said flow regulating portion having a cross-sectional area to substantially span the seat and restrict flow therethrough to said low bypass rate, and said flow limiting portion having a cross-sectional area smaller than that of the flow regulating portion to increase flow through the seat above said low bypass rate when the pressure in the outlet chamber rises above said regulated pressure range and more rapidly build up pressure in the delivery line to said upper switch operating pressure.

5. In a water supply system according to claim 4 wherein said diaphragm of the control apparatus is operative to move said valve member to a fourth axial position when the pressure in the delivery line rises to a value above said upper switch operating pressure, said valve member having a flow shutoff portion thereon dimensioned to fully span the seat and shut off flow therethrough in the fourth axial position of the valve member to limit further increase in pressure in the delivery line.

* * * * *